Dec. 10, 1935.  R. I. WARD  2,023,653
DIRECTIONAL POWER RELAY CONTROL MEANS
Filed Sept. 14, 1934   2 Sheets-Sheet 1

Inventor:
Robert I. Ward,

Dec. 10, 1935.   R. I. WARD   2,023,653
DIRECTIONAL POWER RELAY CONTROL MEANS
Filed Sept. 14, 1934   2 Sheets-Sheet 2

Inventor:
Robert I. Ward,
By Brown, Jackson, Boettcher, Dienner
attys

Patented Dec. 10, 1935

2,023,653

UNITED STATES PATENT OFFICE 2,023,653

DIRECTIONAL POWER RELAY CONTROL MEANS

Robert I. Ward, Chicago, Ill.

Application September 14, 1934, Serial No. 743,979

12 Claims. (Cl. 175—294)

This invention is a modification and continuation of my co-pending application, Serial No. 573,754, filed November 9, 1931, and relates to reverse power differential protection means for use in alternating current circuits, being more particularly directed to the use of a thermionic tube control for delaying the action of the protection means.

In the protection system disclosed in my above-mentioned application, I provide a directional relay in the form of a thermionic tube wherein a certain alternating current voltage is applied to the grid of the tube, a certain alternating current is applied to the plate of the tube, and the plate circuit serves as an indication of variations in the relative phase angle between the grid and plate voltages. The two applied voltages may be functions of the line voltage and current, in which case the relay indicates the direction of power flow, or may be functions of the currents flowing in different portions of the line, in which case the relay is used for differential line protection, or for overload conditions, or for protection against such faults as result in a relative phase change in the voltages or currents in different parts of the alternating current circuit. The grid and plate circuits are so disposed with relation to each other that the grid prevents any substantial current flow in the plate circuit when the phase angle between the line current and line voltage is such as to indicate normal power flow in one direction in the line, and permits current to flow in the plate circuit when the phase angle has changed to indicate a change in direction of power flow, an overload condition, or the like.

The plate circuit is connected to the energizing coil of a relay which controls the circuit leading to the trip coil of a circuit breaker or other interrupting means, and upon predetermined flow of current in the plate circuit the relay is actuated to close this circuit for interrupting the line. As disclosed in my copending application, mechanical time delay means are provided for controlling the operation of this relay.

The present invention, in its preferred embodiment, contemplates the provision of a thermionic directional power relay with time-current characteristics similar to those of a standard reverse power relay, the time-current characteristics corresponding in operation to the operation of the ordinary type of mechanical time-controlled relay but being obtained independently of the movement of mechanical parts.

A primary object of the present invention is the provision of a thermionic directional or overload power relay circuit for an alternating current line having a time-controlled thermionic tube for delaying the action of the tripping relay, the time delay being selectively controlled independently of the movement of mechanical parts and capable of extremely sensitive adjustment.

Another object of the present invention is to provide a thermionic tube in the time delay circuit of the tripping relay which has a grid normally subjected to a predetermined potential negative with respect to the cathode of the tube. The potential impressed upon this tube is balanced at such a point as to maintain substantially no current flow through the plate circuit of this tube. The directional or overload thermionic power relay is adapted, upon a variation in phase angle such as heretofore explained, to impress a positive potential upon the grid of the time delay controlling tube, and thus counteracts the negative voltage of the biasing circuit. Upon a proportionate increase in the impressed positive potential supplied by the power relay circuit, the grid circuit of the tube begins to allow current flow through the plate circuit, resulting in energization of the tripping relay.

A still further object of the present invention is the provision of adjustable means for selectively varying the time period necessary before the effect of the negative biasing circuit is sufficiently counteracted to permit current flow through the plate circuit.

An additional feature of the present invention is the provision of a timing circuit which is independent of the directional control circuit controlled by the thermionic directional power relay, and which is not energized until the reverse current flow exceeds a predetermined minimum. The timing circuit is therefore independent of the grid voltage in the directional power relay and also independent of current flow in the plate circuit of the power relay below the predetermined minimum current flow necessary to energize the timing circuit.

It is also an object of the present invention to couple both the main thermionic directional power relay, and the thermionic time control relay to a life indicator circuit, whereby deterioration of the thermionic tubes, due to lower electron emission of the cathode, or loss of vacuum in the tube, will be indicated prior to actual deterioration of the tube, so that the tube may be replaced before its usefulness is destroyed.

It is another object of the invention to provide a timing circuit having such characteristics that it will not be affected by surges on the line or temporary power disturbances if the power is flowing in the normal direction, and will not actuate the tripping circuit under these conditions.

An additional advantage secured by the present invention is the provision of a timing circuit in which the operating time starts after the reversal of power flow in the main transmission line.

Compared with the initial cost and maintenance of the standard reverse power relays, the thermionic time controlled relay is distinctly advantageous, and has no moving parts except the simple auxiliary type relays.

An additional feature secured by the use of such a thermionic time control circuit is that it is more sensitive under low voltage conditions than the present type of reverse power relays, and thus more adjustable in its operation to provide a control capable of meeting extremely exacting requirements.

Other objects and advantages of the present invention will appear more fully from the following detailed description, which, taken in connection with the accompanying drawings, will disclose to those skilled in the art the particular construction and operation of a preferred embodiment of my invention.

Figure 1:
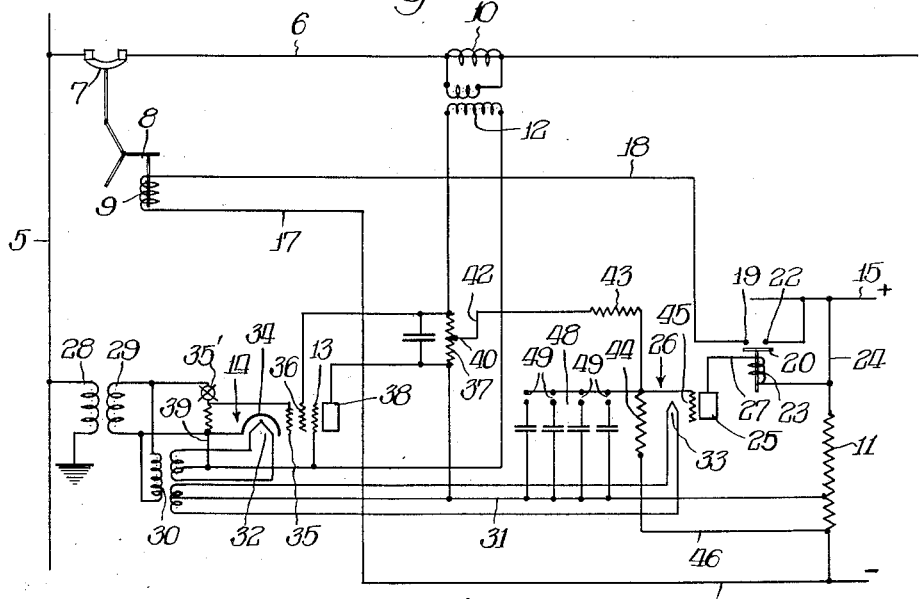
Figure 1 is a circuit diagram of one form of my directional power relay control means provided with the thermionic control timing circuit.

Referring now in detail to Figure 1, I have disclosed the station bus 5, which is connected to the alternating current line 6 through a circuit breaker 7 having trip mechanism 8 controlled by the trip coil 9.

The line 6 is provided with a line current transformer 10 of the standard type, and has special saturating transformers as shown at 12, connected on one side to the suppressor grid 13 in the thermionic reverse power relay control tube 14, and also through the conductor 39 to the cathode of the tube. The opposite side of the saturating current transformer 12 is, for expedience, connected to a resistance 11 interposed between the positive bus 15 and negative bus 16 of a direct-current operating bus supply circuit, the negative bus 16 being connected through conductor 17 to the energizing coil 9, which has its circuit completed through the conductor 18, contact 19, relay 20, contact 22 and conductor leading to the positive bus 15. The relay 20 is adapted to be energized by the coil 23 connected by conductor 24 to the bus 15, and also connected to the plate 25 of the thermionic time control tube 26 by means of conductor 27.

The station bus 5 is provided with a potential transformer 28, the secondary of this transformer 29 having a filament winding 30, the secondary of the filament winding 30 leading to the heating filaments 32 and 33 of the tubes 14 and 26, respectively. The cathode 34 of the tube 14 is connected to the potential transformer 28 and, if desired, may be connected to ground at this transformer. From the secondary 29 of the potential transformer a conductor leads to the grid 35 controlling the flow of electrons from the cathode 34 to the plate 38 connected to the secondary of the current transformer. A suitable fixed resistance or lamp 35' is interposed in this circuit to provide a fixed potential upon the grid 35.

It will be noted that normally the transformer 12 is connected through resistor 37 to a conductor 31 which is at zero potential with respect to the tube 26. The current flow through resistor 37 thus is controlled by the circuit extending through the plate of the tube 14.

As is normally the case in a control system of this type, as described in detail in my above referred to copending application, the grid 35 normally prevents electron flow from the cathode 34 to the plate 38, there being a certain current impressed upon the plate 38 which is in such phase relationship that the current in the plate circuit controlled by the plate 38 is maintained either at substantially zero, or at a substantially fixed predetermined minimum value.

Referring now to the timing circuit for the control system shown in Figure 1, the resistor tap 40 is adjustably connected to the resistor 37, so that any desired minimum ampere setting may be obtained, depending upon the sensitivity and time-current characteristics desired in the circuit. The tap 40 is connected through conductor 42 to the resistor or grid leak 43, which, in turn, is connected to the grid 45 of the tube 26. However, the grid 45 is also connected, through resistor 44 and conductor 46, to the negative bus 16. During normal operation of the station bus 5 and the line 6, the negative operating bus 16 supplies a negative potential through conductor 46 and resistance 44 to the grid 45, maintaining this grid at a negative potential such that insufficient current is permitted to flow through the relay coil 23 to the plate 25. This maintains the coil 23 of the relay 20 unenergized so that the relay is not moved into engagement with contacts 19 and 22.

However, when the current in the secondary of the current transformer moves out of phase relationship with respect to the voltage impressed upon the grid 35, the grid allows electrons to flow from the cathode 34 to the plate 38, thereby allowing flow from the saturating type special transformer 12 through the resistor 37 and plate 38 to the cathode 34. The potential across resistor 37 is transferred, by means of the tap 40, to the conductor 42, and, through resistor 43, is impressed upon the grid 45.

The increasing positive potential impressed upon the grid 45 in this manner serves to counteract the negative potential provided by the bus 16 and conductor 46, and thereby overcomes the negative potential on the grid 45. The rate at which the positive potential is increased above the negative potential, which may be of any predetermined value, is controlled by the condenser or capacitor 48, which is connected between the filament winding for the filament 33 and the grid 45. Suitable taps 49 are provided in the condenser 48 for determining the charging rate of the condenser or capacitor. The capacitance of the condenser, being adjustable, serves to adjust the time period within which the positive potential upon the grid 45 is increased to an extent such as to allow current flow from the bus through conductors 24, energizing coil 23, conductor 27 and plate 25 to filament 33, producing sufficient current flow after a predetermined period of time to effect energization of coil 23 for actuating the relay 20.

The relay 20, upon actuation, bridges between contacts 19 and 22, closing the circuit to the tripping coil 9 for the circuit breaker or other circuit interrupting means, thus opening the circuit in line 6. It is to be understood that the system is capable of ready application to a three-phase alternating current transmission or power line.

Thus, upon a reversal of current flow in the line 6, as sensed by the transformer 12, plate current flows from the plate 38 to the cathode 34, resulting in current flow through the resistor 37 of such value as to provide for impressing a positive potential, that is, with respect to the negative potential imposed by negative bus 16, upon the grid 45 of the thermionic time control tube 26. This results in current flow through the energizing coil 23, and, as determined by the setting of the condenser or capacitor 48, and also the minimum current setting of the tap 40, results in actuation of the tripping relay.

However, the circuit shown in Figure 1 is not applicable for power control means wherein the station bus 5 may operate at low voltage due to a fault condition, or where the line 6 is not of sufficient length to provide a high reactance. That is, the control circuit is not operable in situations which require close selectivity, and in short operating lines adjacent the station. This is due to the fact that with a decrease in the bus voltage in station bus 5, there is a corresponding decrease in potential of the grid 35, and instead of speeding up the operation of the tripping relay 20, the operation is correspondingly slowed down, due to the fact that current flow in the plate circuit controlled by plate 38 is not increased because of the decrease in potential in the grid 35.

The grid 13 acts to prevent the secondary electrons from the plate 38 returning to the cathode 34, while the screen grid 36, which is connected to the transformer 12 serves, in effect, to reduce the space which the electrons from cathode 34 have to travel to reach the plate 38, and thereby acts as a booster grid. The tube 26 may, if desired, be provided with a cathode, the cathode in that case being connected directly to conductor 31.

The circuit shown in Figure 1 is also subject to the disadvantage that some current will also be flowing in the special transformer 12 during operation of the line 6, and this current may be carried through the conductor 42 to the grid 45, thereby not providing as sensitive or selective time control for the circuit as is desirable in certain instances.

In order to overcome the disadvantages of application of the circuit shown in Figure 1, which can only be used in situations where the station bus voltage is relatively constant, or the lines are of sufficient length to provide a high reactance to prevent large variations in bus voltage due to fault conditions, although the circuit in Figure 1 is considerably more economical than the hereinafter described circuits, I have provided the time control circuit shown generally in Figure 3.

In this circuit, I have preferably illustrated the application of the modified control circuit to a three-phase system, comprising the three station bus conductors 100, 102, and 103, corresponding to the first, second and third phases of a three-phase circuit, and which are connected, through circuit breaker 104, to the corresponding line conductors 105, 106, and 107.

The circuit breaker 104 has tripping mechanism indicated at 108, which is actuated by the energizing or tripping coil 109 connected through conductors 110 and 112 to the negative operating bus conductor 113 and the positive operating bus conductor 114, respectively, which have resistances 111 thereacross.

Figure 2:
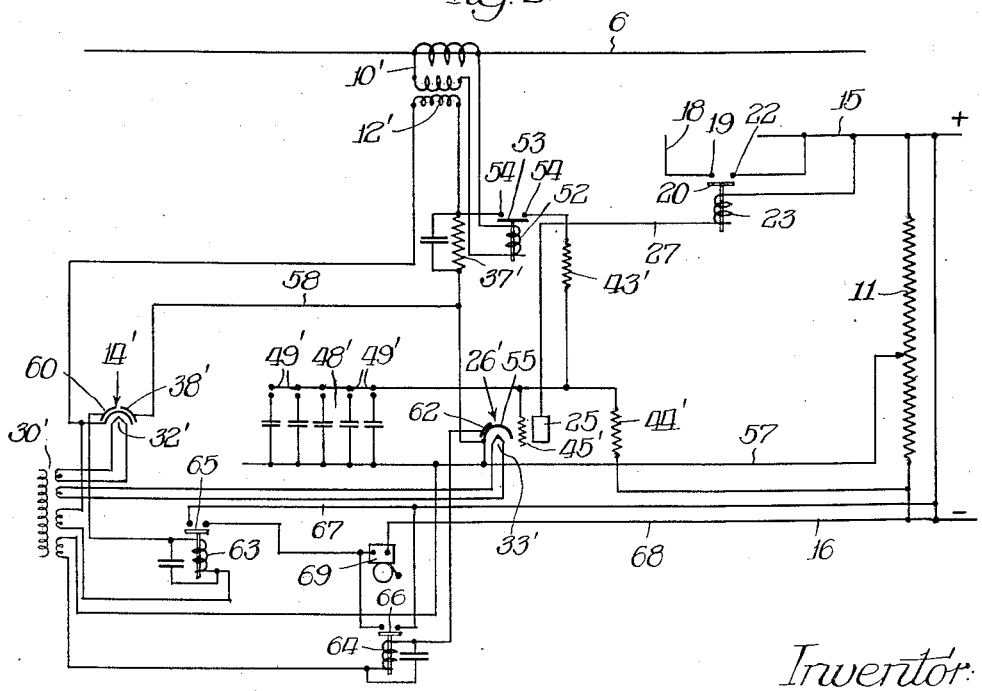
Figure 2 is a slightly modified circuit diagram of a control means embodying the present invention.

Each of the station buses 100, 102, and 103 is provided with a potential transformer indicated generally at 115, and each of the line conductors 105, 106, and 107 is provided with current transformers 116, corresponding to the current transformers 10 and 10' of Figures 1 and 2. The potential transformers are preferably connected in certain predetermined phase relationship with respect to the current transformers, to compensate for phase shifting of the saturating transformers and phase shifting introduced by faults on the line.

The tripping circuit for the circuit breaker trip coil 109 corresponds in detail with the circuit described in connection with the embodiments of Figures 1 and 2, distinguishing therefrom only in being provided with three parallelly connected sets of contacts 117, 118, and 119, corresponding to the three phases for the three phase alternating current line. These contacts are each adapted to be actuated by a relay 120 controlled by the energizing coil 121 connected between the positive operating bus 114 and the plate 122 of each of the thermionic time control tubes indicated generally at 123.

Each of the potential transformers 115 has a filament transformer 125 connected therewith, which filament transformer 125 is adapted to control the heating circuits for the filaments 126 of the tubes 123. The directional power control thermionic relay includes the tubes 130, corresponding to the tube 14 of the circuit disclosed in Figure 1, and the filaments 132 of each of these tubes are also connected to the filament transformer 125.

The tubes 130 are of special construction, having a plate 133, three grids 134, 135, and 136, and a special plate 137. In addition, the tubes 130 may be provided with an additional plate for connecting the tubes to a tube life indicating circuit, as will be described in connection with Figure 2. The cathodes of the tubes 130 are connected to the potential transformers 115, and the grids 136 of the tubes 130 are adapted to control the flow of electrons from the cathodes of the tubes to the plates 133, for controlling the flow of current through the saturating transformers 152 and plates 133. The grids 134 of the tubes 130 serve to prevent secondary electron discharges from the plates 133 affecting the operation of the control grids, and the grids 135 act as booster grids for decreasing the effective space within the tube through which the electrons from the cathodes must travel to the plates.

This tube has been chosen as of the particular type shown because the plate current in such a tube tends to become constant with increasing of the plate voltage, and this provides for better control for reverse power application.

The tubes 123 are also of special type, corresponding somewhat to a three-element tube and the characteristics of this tube are such that the plate current increases rapidly with an increase of grid voltage. This characteristic makes the tube more efficient for use with auxiliary relays, and also, since the plate resistance of the tube is approximately 800 ohms, in a preferred embodiment of the invention, the tube is satisfactory for operation on low plate voltage. If desired special plates may be provided for each of the tubes 123 and 130 to connect the tubes to the tube life indicating circuit.

Figure 3:
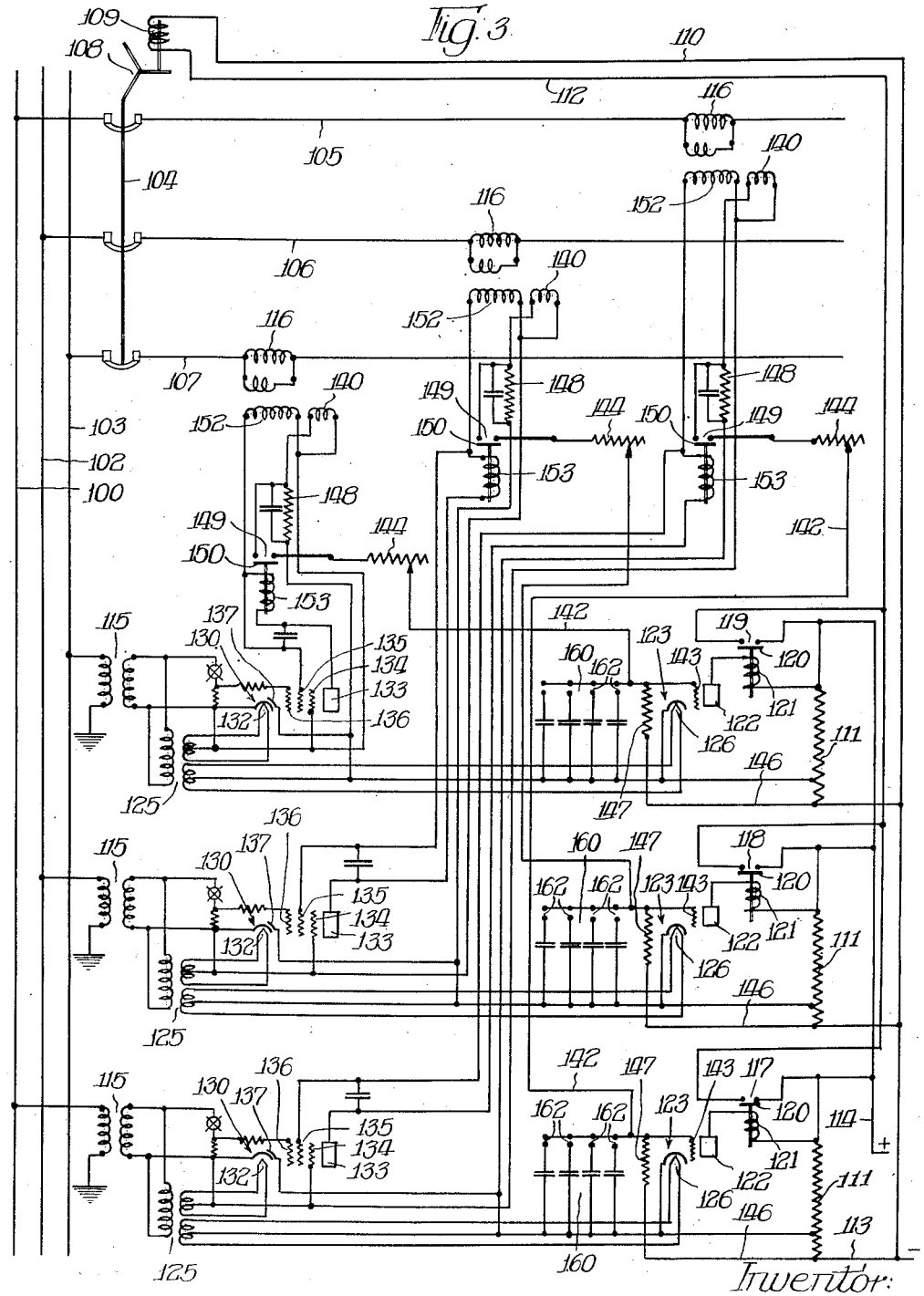
Figure 3 is a diagrammatic circuit disclosing the application of one form of my directional power relay control means and timing circuit to a three-phase alternating current transmission line.

The transformers 152 of the embodiment shown in Figure 3 are provided with an additional winding 140 added to the special saturating transformer, the winding 140 being employed to supply the positive grid potential to the tube 123, this potential being supplied through conductor 142, connected to the grid 143 of the tube 123 and leading to the resistor 144 connected to one side of the special winding. Thus, when an abnormal condition results in current flow through plate 137 of the tube 123, the voltage drop across the resistor 148 is such as to produce a positive direct current potential from the common connection between windings 152 and 140 through the cathode 130 and plate 137 to the conductor leading to the other side of winding 140. The voltage drop across resistor 148 in this circuit provides for a positive potential being impressed through contacts 149, resistor 144 and conductor 142 upon the grid 143 of the tube 123.

During normal operation of the system, negative potential is impressed upon the grids 143 of the tubes 123 by reason of the conductors 146 leading through resistances 147 to the grids 143 from the negative operating bus connection 113. The resistors 148, connected between the special windings 140 of the saturating transformers 152 and the plates 137, correspond generally to the resistors 37 and 37' of the embodiments disclosed in Figures 1 and 2. This resistance is used in a special plate circuit 137 of the tubes 130, and the special plates 137 of each of the tubes 130 are fixed plates surrounding the common cathodes of the tubes, and independent of the other elements of the tubes. The purpose of these elements is to rectify the current from the special windings 140 of the special current transformers to furnish a positive direct current voltage to the tubes 123 when the contacts 149 of a relay 150 are closed by current flowing through the winding 152 of the special saturating transformer. This current flow is produced by the relative phase displacement between the line current, as indicated by the voltage drop across windings 152 and impressed upon the plate 133, and the bus voltage impressed upon the grid 136, whereby the grid allows plate current to flow to the cathode of the tube. This flow of current results in energizing the coil 153, actuating the relay 150 to close the contacts 149, and thereby closing the direct current circuit to the grids of the time control tubes 123.

Inasmuch as the contacts of the auxiliary relay 150 must close before the positive direct current circuit to the grids of the timing circuit is energized, it will be apparent that the timing circuit cannot initiate its operation until there is a reversal of power sufficient to operate the auxiliary relay 150, or a sufficient overload upon the line in the reverse direction to accomplish this purpose. If the fault current of the line is in the reverse direction and is of sufficient magnitude and exists for a sufficient period of time, to provide for imposing a predetermined positive potential upon grid 143, current will flow through the plate circuit of tube 123, and the auxiliary relay 120 of the timing circuit then closes its contacts and causes the line circuit breaker to open in the manner described in connection with the previous embodiment.

Thus, during normal operation of the protection system, when the relay 150 is unenergized and current is flowing normally in one direction or beyond line conductors 105, 106 and 107, there is not sufficient flow of current caused by an abnormal line condition to energize the plate circuit through the plates 133 of the tubes 130, and hence no substantial flow of current sufficient to energize coils 153 of the relays 150. At the same time, since the relays are opened, there is no direct current voltage imposed upon the resistors or grid leaks 144 from the special or additional windings 140 of the special saturating transformers 152, and hence there is no positive potential being applied to the conductors 142. During this time, the grids 143 of the tubes 123 are under a negative potential determined by the potential of the operating bus 113, and the resistors 147. This negative potential is sufficient to prevent any substantial current flow in the plate circuit of tube 123 from the positive bus conductor 114 through the energizing coil 121 of relay 120 and thence through the plates 122 of tubes 123 to ground or to the negative bus. Thus, the relays 120 remain unenergized, and the grids 143 remain at a constant or predetermined negative potential.

Upon reversal of current flow in the line conductors 105, 106 or 107, of sufficient magnitude and for a sufficient period of time to indicate a fault or the like, the special saturating transformers 152, which are supplying voltage from the current transformers 116 through the coils 153 of relays 150 to the plate 133, complete a circuit by reason of the grid 136 getting into a relative phase position with respect to the plate 133, and thereby allowing current flow from the plates 133 of the tubes 130 through the cathodes of the tubes, thus completing a circuit between coil 153, plate 133 and the cathode of tube 130. This results in passing an energizing current through the coils 153, resulting in actuation of relays 150 to close contacts 149. Closing of the contacts 149, therefore, does not occur until a reversal of power has occurred which is of sufficient magnitude to operate the relay 150.

The time control circuit therefore begins its effective control of the tubes 123 only after this reversal has occurred and the relays 150 have been energized. The common conductor of windings 152 and 140 is connected to the cathode of the tube 130, and the plate 131 completes a circuit through the tube 130 to the other side of the winding 140. By reason of the special plates 137, which acts as a rectifier providing a direct current component in resistors 148, a direct current is supplied from the special windings 140 through the contacts 149 to the resistors or grid leaks 144, which direct current is positive in potential, and this positive potential is applied through the conductors 142 to the grids 143 of the tubes 123, thereby tending to counteract the negative potential supplied by the negative operating bus 113. This produces current flow through the plates 122 of the plate circuits controlling the relays 120, and, when a sufficient current has been built up in this circuit, the relays 120 are energized to actuate or close the circuit for the tripping coil 109 of the circuit breaker 104.

Preferably the condensers 160, corresponding to the condensers 48 and 48' of Figures 1 and 2, are connected in such manner as to control directly the time required to build up a sufficient positive potential upon the grid 143 to counteract the negative potential impressed thereon by the negative operating buses. The condensers or capacitors 160 are provided with a plurality of taps 162, which provide for selective control of the time-current characteristics of the tubes 123, so that by varying the charging rate of capacitance of the condensers or capacitors, the time necessary for producing operation of the relay 120 after the relay 150 has been energized can be preselected. Also, by varying the minimum current setting for the additional windings 140, or the resistors 144, the time characteristics of the positive potential applied to the grids 143 may also be controlled.

Thus it is apparent that I provide, in the embodiment in Figure 3, an additional winding in the saturating transformer which provides for producing a positive direct current potential upon the grid of the time-controlling tubes, this positive potential being effected by means of a special rectifying plate in the circuit of the directional power relay. Further, I provide a system in which the timing circuit is entirely independent of the operating circuit for the directional power control relays, and is actuated only after energization of and independently of the current flowing in the thermionic directional power relay circuit.

Also, because of the characteristics inherent in the timing circuit as disclosed, the relays 120 will not be affected by surges upon the line, or temporary disturbances if the power is flowing in the normal direction, due to the time-current characteristics of this circuit as determined by the capacitance of the condensers and the minimum current settings of the direct current positive potential supplying means.

The circuit shown in Figure 2 comprises the current transformer 10' having its primary connected to the line 6, and having its secondary provided with an energizing coil 52 for actuating a relay 53 to engage the spaced contacts 54. The coil 52 is so arranged with respect to the transformer 10' that a predetermined minimum current flow through the secondary of this transformer is necessary in order to produce actuation of the relay 53. The transformer 12' is connected through the resistor 37' to the biasing cathode 55 of the tube 26' and from there to the conductor 57, which conductor is connected between the negative operating bus 16 and the positive operating bus 15 by means of a resistance 11 such that the potential is maintained substantially zero with respect to the tube 26'. The resistor 37' has a branch connection through conductor 58 to the plate 38' of the tube 14'. The tube 14' is employed for rectifying the current in the plate circuit to supply direct current potential to the timing circuit.

The filaments 32' and 33' of the tubes 14' and 26', respectively, are connected to the filament heating coils of the filament transformer 30' in the same manner as noted in connection with Figure 1. When the plate circuit controlled by the plate 38' is energized, plate current flows from the transformer 12' through the resistor 37' and conductor 58 to the plate 38'; and from the plate to the cathode of the tube 14'. The rectifying tube 14' thus produces direct current flow through resistor 37'.

This results in a flow of current to the contact 54, and, since there is current flowing in the line 6, the relay 53 is in actuated or bridging position across the contacts 54, providing for a flow of current through the resistor or grid leak 43' to the grid 45' of the tube 26'. The plate circuit of the tube 26' corresponds to the plate circuit of the tube 26 of Figure 1, and the same reference numerals have been employed to identify the same. A negative potential from the negative operating bus 16 is impressed through resistor 44' upon the grid 45' of the tube 26', and this negative potential is counteracted by the voltage across resistor 37'. The time delay for the operation of the relay 20 is controlled by a capacitor 48', corresponding to the condenser or capacitor 48 of Figure 1, provided with the selective taps 49' for effectively controlling the charging rate of the condenser, and thereby effectively controlling the rate at which the positive potential from the resistor 43' overcomes the negative potential upon the grid 45' supplied by the negative operating bus 16.

In the embodiment shown in Figure 2 I have also provided means for indicating the deterioration in the life of the tubes 14' and 26'. In the specific embodiment disclosed, the tubes 14' and 26' are provided with special plates 60 and 62, which are connected to the energizing coils 63 and 64 of relays 65 and 66. These relays, upon actuation, are adapted to bridge across contacts carried by conductor 67 leading to the positive operating bus 15 and conductor 68 leading to the negative operating bus 16 to effect actuation of an alarm means or the like shown at 69. The current for the energizing coils 63 and 64 is provided by separate windings of the filament transformer 30', and it is therefore apparent that the cathodes of the tubes 14' and 26' do not have to be at the same potential in order to secure this tube-life indicating operation.

The particular operating characteristics of the tube-life indicating circuit disclosed are more clearly described in connection with my copending application, Serial No. 638,513, filed October 19, 1932, which is directed particularly to this circut for indicating the deterioration of the life of a thermionic tube, either by the lowering of the rate of electron emission from the cathode thereof, or by the loss of vacuum within the tube.

Further, by providing the combination of this control means with a tube-life indicating circuit, the loss of vacuum in the tube, or the lowering of the rate of electron emission from the cathodes of the tube can be readily ascertained, and defective tubes may be replaced before they fail, thereby preventing a failure of a tube from destroying the effectiveness of the protection circuit.

Having described my invention in accordance with the patent statutes, what I claim as new and desire to secure by Letters Patent is:

1. In combination, an alternating current line, a circuit breaker therefor, a timing circuit including a relay adapted to actuate said circuit breaker, a thermionic tube in said circuit having a plate circuit and a grid, said plate circuit being adapted to energize said relay upon predetermined current flow therethrough, means normally maintaining said grid at a negative potential sufficient to prevent any substantial current flow through said plate circuit, means responsive to an abnormal condition on said line and including a condenser for imposing a positive potential on said grid to produce current flow in said plate circuit, and means for varying the charging rate of said condenser, and means for controlling said positive potential in accordance with the line current valve in said alternating current line.

2. In combination, a station bus, an alternating current line, a circuit breaker therebetween, means including a thermionic tube responsive to abnormal phase relationship between said bus and line for allowing plate current flow through said tube, an independent timing circuit for operating said breaker, means normally imposing a substantially constant negative potential on said timing circuit, means normally preventing operation of said breaker by said timing circuit, means responsive to minimum plate current flow in said first tube for energizing said timing circuit including means for supplying direct current at a positive potential to said timing circuit for biasing said timing circuit to operate said breaker, and means providing for control of the rate at which said positive potential is supplied in accordance with the line current flow in said alternating current line.

3. In combination, an alternating current line, a circuit breaker therefor, a hot cathode tube having a plate circuit adapted to trip said circuit breaker upon predetermined current flow therethrough, a grid for said tube, means normally maintaining said grid at a negative potential preventing substantial current flow through said plate circuit, relay means operable upon reversal of current flow in said line for connecting said grid to a line current transformer, said relay means including rectifying means for imposing a counter potential upon said grid for overcoming said negative potential to permit current flow in said plate circuit, and means controlling the length of time elapsing before said counter potential is sufficient to permit said predetermined current flow through said plate circuit, and means responsive to line current flow for controlling the value of the counter potential imposed on said grid.

4. A timing circuit for operating current interrupting means on an alternating current line including a thermionic tube having a plate circuit, means controlled by predetermined current flow through said plate circuit for actuating said interrupting means, a saturating transformer on said line, a grid for said tube, a direct current operating bus normally maintaining said grid at a potential preventing any substantial current flow through said plate circuit, a current transformer in said line adapted to condition said timing circuit for operation upon predetermined current flow through said line, rectifying means connected to said saturating transformer and operable upon abnormal phase displacement in said line for supplying direct current to said grid to bias the potential supplied thereto by said operating bus to produce increasing current flow through said plate circuit proportional to the flow of current in said line, and a condenser for interposing a time delay between operation of said rectifying means and biasing of the potential on said grid.

5. In combination, in a three-phase alternating current system, directional power relay means therefor, a timing circuit including three thermionic tubes having plate circuits, grids for each of said tubes, means for normally maintaining a negative potential on said grids for preventing any substantial current flow through the plate circuits, and means responsive to actuation of said relay means for imposing a positive potential on at least one of said grids to permit predetermined current flow through the corresponding plate circuit, circuit breaker means for said three-phase system operated by said predetermined current flow through any one of said plate circuits, and means responsive to the current flow in said system for controlling the rate at which said potential is imposed on said grids.

6. In a three-phase alternating current system, a circuit breaker therefor, power directional relay means in said system, a thermionic timing circuit, means energized by predetermined current flow in said system for conditioning said timing circuit for operation, means including a saturating transformer in said system energized upon operation of said relay means for supplying direct current to said timing circuit in accordance with the current flow in said system, means in said timing circuit controlling the rate at which said direct current is supplied thereto, and means in said timing circuit responsive to a predetermined increase in positive potential therein for actuating said circuit breaker.

7. In combination, in an alternating current system, a timing circuit including a thermionic tube, means for normally maintaining a negative bias on the grid of said tube to prevent current flow through said tube, means responsive to a predetermined current flow in said system for conditioning said timing circuit for operation, a thermionic power relay responsive to abnormal conditions in said system for imposing a positive potential direct current on said grid including a saturating current transformer in said system for supplying said potential in accordance with the current flow through said system.

8. In combination, in an alternating current system, an alternating current line, a circuit breaker in said line, trip means for actuating said breaker, a timing circuit including a thermionic tube, means for normally maintaining a negative bias on the grid of said tube to prevent current flow through said tube, means actuated by current flow through said tube for operating said trip means, means responsive to a predetermined current flow in said system for conditioning said timing circuit for operation, a thermionic power relay responsive to abnormal conditions in said system for imposing a positive potential direct current on said grid including a saturating current transformer in said system for supplying said potential in accordance with the current flow through said system.

9. In combination, an alternating current line, a timing circuit including a grid and a plate circuit, means actuated by predetermined current flow through said plate circuit for interrupting the circuit through said line, means normally maintaining a negative potential on said grid to prevent said current flow through said plate circuit, a separate circuit for supplying a positive potential to said grid, a switch in said separate circuit, means responsive to predetermined current flow in said line for closing said switch, and a thermionic power relay responsive to abnormal conditions in said line for imposing a direct current positive potential on said separate circuit in accordance with current flow in said line to overcome said negative potential to provide for current flow through said plate circuit.

10. In combination, an alternating current line, a timing circuit including a thermionic tube, means for normally maintaining a negative potential in the grid of said tube to prevent current flow therethrough, a separate circuit for the grid of said tube, a current transformer in said line and adapted to maintain said separate circuit in operating condition upon predetermined minimum current flow through said line, a saturating transformer in said line, a thermionic relay responsive to abnormal conditions in said line for converting the potential of the secondary of said transformer into a direct current positive potential and imposing said potential on said separate grid circuit to overcome said negative potential on said grid for permitting current flow through said tube.

11. In combination, an alternating current line, means for interrupting the circuit through said line, a timing circuit including a thermionic tube, means normally maintaining a negative potential on the grid of said tube, condenser means in the grid circuit of said tube, means normally maintaining a negative potential on said condenser means, means responsive to abnormal conditions in said line for producing a positive direct current potential, said means imposing said positive potential on said grid and condenser means quantitatively in accordance with line current flow, and means in said timing circuit actuated by a predetermined positive potential on said grid for energizing said interrupting means.

12. In a three phase alternating current system, alternating current lines, a circuit breaker for said lines, trip means for actuating said breaker, timing circuits for each of said lines including thermionic tubes having grids, means normally maintaining a negative potential on said grids, individual plate circuits for each of said tubes individually operable when a predetermined positive potential is impressed on said grids for energizing said trip means, means energized by predetermined current flow in each of said lines for conditioning said respective timing circuits for operation, and means including a saturating transformer for each of said lines and a thermionic power relay in the secondary circuit of each of said transformers responsive to abnormal conditions in the respective lines for imposing a direct current positive potential on said corresponding grids, said means providing for increased positive potential on said grids in accordance with increased line current.

ROBT. I. WARD.